(12) United States Patent
Hsieh et al.

(10) Patent No.: US 7,369,930 B2
(45) Date of Patent: May 6, 2008

(54) METHOD AND APPARATUS TO CONTROL HYDRAULIC PRESSURE IN AN ELECTRICALLY VARIABLE TRANSMISSION

(75) Inventors: Tung-Ming Hsieh, Carmel, IN (US); Gregory A. Hubbard, Brighton, MI (US); Michael D. Foster, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 711 days.

(21) Appl. No.: 10/846,017

(22) Filed: May 14, 2004

(65) Prior Publication Data

US 2005/0256626 A1      Nov. 17, 2005

(51) Int. Cl.
*G06F 19/00* (2006.01)
(52) U.S. Cl. .......................................... 701/67; 701/68
(58) Field of Classification Search ............ 701/51–56, 701/67, 68; 137/12, 596.16; 91/448, 424
See application file for complete search history.

(56) References Cited

U.S. PATENT DOCUMENTS 3,283,862 A * 11/1966 Warnock .................. 192/18 A
5,931,757 A *  8/1999 Schmidt ......................... 475/2
6,910,493 B2 *  6/2005 Foster et al. .................. 137/12

* cited by examiner

*Primary Examiner*—Richard M. Camby (57) ABSTRACT

A method and apparatus to control an electrically variable transmission, by dynamically controlling system main hydraulic clutch pressures, based upon required clutch capacity, as determined by output load of the transmission. Included is a method to regulate hydraulic clutch pressure in an electrically variable transmission equipped with at least one clutch. This comprises monitoring magnitude of slippage of the clutches and controlling hydraulic boost pressure based upon the magnitude of clutch slippage. Controlling hydraulic boost pressure based upon the magnitude of clutch slippage comprises monitoring operator inputs, determining a requested operator torque command, and determining a required main boost pressure. The main boost pressure is based upon the requested operator torque command, the monitored operator inputs, parameters of the EVT and clutches. Commanded main boost pressure is then determined based upon the determined required main boost pressure.

11 Claims, 5 Drawing Sheets

METHOD AND APPARATUS TO CONTROL HYDRAULIC PRESSURE IN AN ELECTRICALLY VARIABLE TRANSMISSION

TECHNICAL FIELD

This invention pertains generally to control of an electrically variable transmission for a powertrain, and more specifically to control of hydraulic clutch pressure of the electrically variable transmission for the powertrain.

BACKGROUND OF THE INVENTION

Powertrain systems for use in vehicles are expected to operate over a wide range of speed and load conditions. One type of powertrain system includes an electrically variable transmission (EVT) which provides for continuously variable speed ratios by combining features from both series and parallel hybrid powertrain architectures. EVTs are operable with a direct mechanical path between an internal combustion engine and a final drive unit thus enabling high transmission efficiency and application of lower cost and less massive motor hardware. EVTs are also operable with engine operation mechanically independent from the final drive or in various mechanical/electrical split contributions thereby enabling high-torque continuously variable speed ratios, electrically dominated launches, regenerative braking, engine off idling, and multi-mode operation.

An electrically variable transmission includes friction elements, referred to as clutches, which transfer torque from the internal combustion engine and electrical motors of the EVT to the final drive line. The clutches are typically hydraulically operated, and the torque capacity is based upon magnitude of applied clutch pressure. Higher hydraulic clutch pressure requires higher power input to the hydraulic pump. The difference between actual hydraulic pressure and required hydraulic pressure to meet the required torque capacity represents hydraulic power loss.

What is needed is a method and apparatus to dynamically control system main hydraulic clutch pressures of an electrically variable transmission, based upon required clutch capacity, as determined by output load of the transmission, to reduce hydraulic power loss.

SUMMARY OF THE INVENTION

The present invention provides a method and apparatus to control an electrically variable transmission, by dynamically controlling system main hydraulic clutch pressures, based upon required clutch capacity, as determined by output load of the transmission. In accordance with the present invention, a method to regulate hydraulic clutch pressure in an electrically variable transmission equipped with at least one clutch is shown. This comprises monitoring magnitude of slippage of the clutches, and, controlling hydraulic boost pressure based upon the magnitude of clutch slippage. Controlling hydraulic boost pressure based upon the magnitude of clutch slippage comprises monitoring operator inputs, determining a requested operator torque command, and determining a required main boost pressure. The main boost pressure is based upon the requested operator torque command, the monitored operator inputs, parameters of the EVT, and parameters of the clutches. Commanded main boost pressure is then determined based upon the determined required main boost pressure.

Another aspect of the invention includes determining the commanded main boost pressure based upon the calculated required main boost pressure comprising monitoring time of engagement and slippage of each of the clutches, determining adaptive boost pressure terms based upon time of engagement and slippage of the clutches, and compensating the calculated boost pressure term. These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DESCRIPTION OF THE PREFERRED EMBODIMENT

Figure 1:
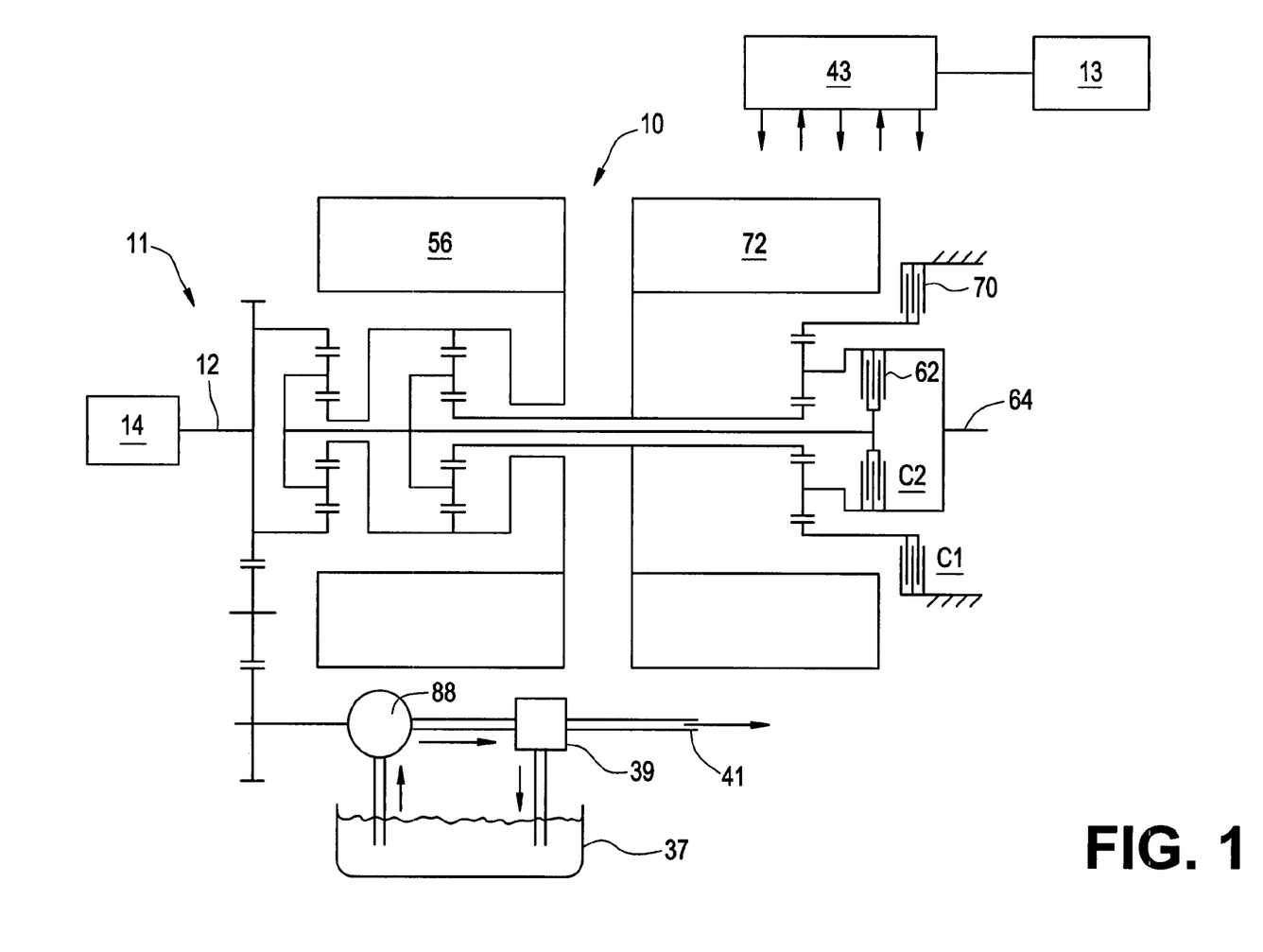
FIG. 1 is a mechanical hardware schematic representation of one preferred form of a two-mode, compound-split, electrically variable transmission particularly suited to the implementation of the present invention.

Referring now to the drawings, wherein the showings are for the purpose of illustrating the invention only and not for the purpose of limiting the same, FIG. 1 shows a mechanical hardware schematic representation of an exemplary form of a two-mode, compound-split, electrically variable transmission and engine particularly suited to the implementation of the present invention. The exemplary system preferably includes a powertrain system 11 with an internal combustion engine 14 and electrically variable transmission (EVT) 10, a system controller 43, and a user interface 13.

The exemplary EVT 10 described hereinafter, including details regarding design and operation, is disclosed in commonly assigned U.S. Pat. No. 5,931,757, the contents of which are incorporated herein by reference. Further details regarding control of the exemplary EVT, including preferred methods for determining engine speed and engine torque and controlling engine speed may be found in commonly assigned and co-pending U.S. Ser. Nos. 10/686,511, 10/686,508, 10/686,034, 10/799,531, which are all incorporated herein by reference.

The EVT has an input member 12 from the powertrain 14, and an output member 64 operably attached to a driveline (not shown). The EVT further includes a pair of friction clutches C1 70 and C2 62, actuated by a hydraulic circuit controlled by the system controller 43. The clutches C1 and C2 effect transfer of torque from the powertrain and electric motors 56, 72 to the driveline (not shown).

The system controller 43 is preferably conventional microprocessor-based controller comprising such common elements as microprocessor, read only memory ROM, random access memory RAM, electrically programmable read only memory (EPROM), high speed clock, analog to digital (A/D) and digital to analog (D/A) circuitry, and input/output circuitry and devices (I/O) and appropriate signal conditioning and buffer circuitry, as is known to one skilled in the art. In the exemplary embodiment, system controller 43 may provide, for example, a variety of control and diagnostic functions related to powertrain, EVT and vehicle chassis including, for example, engine torque an speed commands, input speed control, and output torque control in coordination with regenerative braking, anti-lock braking and traction control. The controller functions to acquire data from a variety of sensors and control a variety of actuators of the system over a plurality of discrete lines. For simplicity, controller 43 is shown generally in bi-directional interface with the system. User interface (UI) block 13 comprises inputs to system controller 43, including vehicle throttle position, push button shift selector (PBSS) for available drive range selection, brake effort and fast idle requests, among others. Such engine electronics, controls and quantities are generally well known to those skilled in the art and further detailed exposition thereof is not required herein.

The system controller 43 receives frequency signals from rotation sensors (not separately illustrated) for processing into input member 12 speed Ni and output member 64 speed No for use in the control of EVT 10. The system controller 43 is able to determine speed Ni and acceleration Ni_dot of input member 12, as well as speed No and acceleration No_dot of output member 64, for use in the control of EVT 10. System controller 43 may also receive and process pressure signals from pressure switches (not separately illustrated) for monitoring application chamber pressures of clutches C1 and C2. Alternatively, pressure transducers for wide range pressure monitoring may be employed. Pulse-width modulated (PWM) and/or binary control signals are provided by system controller to EVT 10 for controlling fill and drain of clutches C1 and C2 for application and release thereof. Additionally, system controller 43 may receive transmission fluid sump 37 temperature data, such as from conventional thermocouple input (not separately illustrated) to derive sump temperature Ts and provide a PWM signal which may be derived from input speed Ni and sump temperature Ts for control of line pressure via regulator 39. Fill and drain of clutches C1 and C2 are effectuated by way of solenoid controlled spool valves responsive to PWM and binary control signals as alluded to above. Trim valves (not shown) are preferably employed using variable bleed solenoids to provide precise placement of the spool within the valve body and correspondingly precise control of clutch pressure during clutch-apply.

The hydraulic circuit of the exemplary EVT system includes a hydraulic pump 88, preferably a positive-displacement rotary pump, in fluid communication with pressure regulator 39 which is in fluid communication with apply chambers of friction clutches C1 70 and C2 62 of the EVT. Sump 37 comprises a fluid storage device for drawing fluid with the pump 88 and exhausting hydraulic fluid through the pressure regulator 39. The hydraulic circuit is operable to supply a quantity of pressurized fluid at a regulated clutch pressure Pc to EVT clutches 62 and 70, as is described hereinafter. The level of engagement of C1 and C2 is determined by the magnitude of regulated clutch pressure Pc supplied to the clutches C1 and C2.

Clutch slip speeds across clutches C1 and C2 are derived from output speed No, EVT first motor/generator 56 MA, operating at speed Na and second motor/generator 72 MB operating at speed Nb. Specifically, slippage of clutch C1 is a function of No and Nb, whereas C2 slip is a function of No, Na and Nb.

Figure 2A:
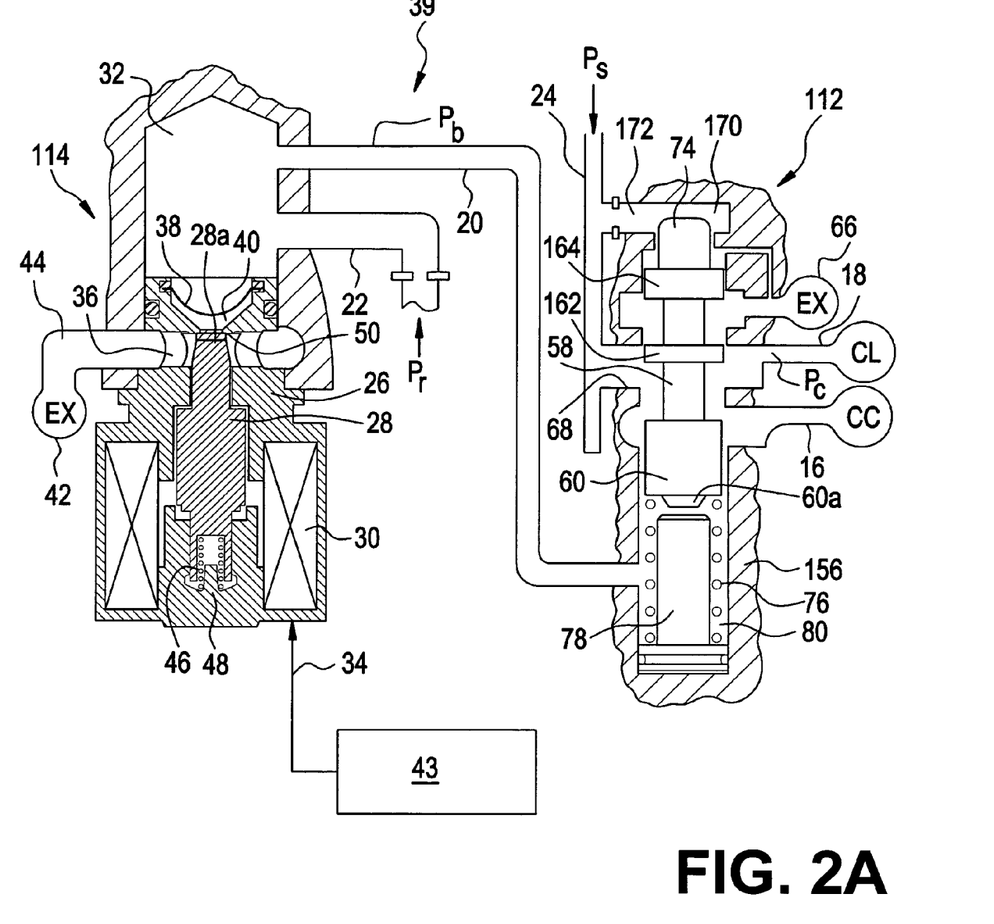
FIGS. 2A and 2B are a schematic of a hydraulic circuit operable to regulate main boost pressure and a graphical representation of pressure for the hybrid powertrain disclosed herein.

Referring to FIG. 2A, the reference numeral 39 generally designates a hydraulic pressure regulation circuit of a motor vehicle transmission, including a hydraulically activated pressure regulator valve (PRV) 112 and an electrically activated boost pressure valve (BPV) 114. The PRV 112 supplies hydraulic fluid to a cooler circuit (CC) via line 16 and regulates a clutch pressure (Pc) in line 18 for at least one hydraulically engaged clutch CL. The BPV 114 supplies a boost pressure Pb to PRV 112 via line 20. The boost pressure Pb is derived from a reference pressure Pr supplied to BPV 114 via flow restricted line 22, while the cooler circuit fluid and clutch pressure Pc are derived from a pump supply pressure Ps in line 24. Of course, the PRV 112 and BPV 114 may be combined into a single valve if desired.

The BPV 114 includes a valve body 26, an armature 28, a solenoid coil 30 and a valve chamber 32 to which lines 20 and 22 are coupled. The solenoid coil 30 is electrically activated via conductor 34 to position the armature 28 within the valve body 26 so that some or all of the hydraulic fluid entering valve chamber 32 via line 22 is directed to an outlet port 36 through a screen 38 and a valve body opening 40 that is axially aligned with the armature 28. The outlet port 36 is coupled to a fluid exhaust 42 via line 44. A spring 46 disposed about a post 48 of valve body 26 biases the armature 28 toward the opening 40, while electrical activation of the solenoid coil 30 produces an electromagnetic force that opposes the spring force for moving the armature 28 away from the opening 40. The magnitude of the solenoid coil current determines the magnitude of the resulting electromagnetic force, and the armature 28 may be moved to a desired position within the valve body 26 simply by controlling the solenoid current.

The lineal position of armature 28 within the valve body 26 determines the boost pressure Pb in valve chamber 32 and line 20. When the armature is positioned as shown in FIG. 2A with its inboard end 28a pressed against a seat 50 defined by the surface portions of valve body 26 adjacent the opening 40, none of the fluid supplied to valve chamber 32 via line 22 passes to outlet port 36, and Pb is essentially equal to the reference pressure Pr. This condition occurs when no current is supplied to solenoid coil 30. The opposite condition occurs when full current is supplied to the solenoid coil 30 to fully retract the armature 28 from the opening 40. In this case, essentially all of the fluid supplied to valve chamber 32 via line 22 is exhausted through opening 40, and Pb is essentially equal to zero. When the solenoid coil 30 is energized at intermediate current levels, the armature 28 partially restricts fluid flow through the opening 40, and Pb can be controlled to any value between zero and Pr.

The PRV 112 includes a valve body 156 and a spool-type valve element 58 having spaced lands 60, 162 and 164. Fluid between the lands 60 and 162 is supplied to cooler circuit CC and clutch CL via lines 16 and 18, and fluid between lands 162 and 164 is directed to fluid exhaust 66. The pump supply pressure Ps in line 24 is coupled to an inlet port 68 and to a bias chamber 170 via flow restricted line 172. The pressure Ps in bias chamber 170 acts on the end 74 of valve element 58, producing a downward force that is countered by the upward force of a spring 76 disposed about a post 78 in valve chamber 80. The spring 76 is designed so that in the absence of any boost pressure Pb in line 20, the valve element 58 will be positioned to regulate the clutch pressure Pc in line 18 to a predetermined minimum value, referred to herein as Pc_min. When the supply of fluid to line 24 is relatively low (i.e., at low pump speeds), the valve element 58 is positioned essentially as shown in FIG. 2A, with the clutch pressure Pc being regulated by varying the fluid flow to the cooler circuit CC via line 16. When the supply of fluid to line 24 is relatively high (i.e., at high pump speeds), the cooler circuit (CC) becomes flow limited, and resulting pressure increase in bias chamber 170 pushes valve element 58 downward; this allows a portion of the fluid supplied to inlet port 68 to pass to exhaust 66 so that the clutch pressure Pc remains regulated at the predetermined value Pc_min. Boost pressure Pb in line 20 is directed to the valve chamber 80 in which spring 76 is disposed, and effectively increases the spring force to increase the regulated clutch pressure Pc. This relationship is graphically depicted in FIG. 2, which shown the clutch pressure Pc as a function of boost pressure Pb. When the solenoid coil 30 of BPV 114 is fully energized so that the boost pressure Pb is zero, Pc is regulated at the predetermined minimum value Pc_min. When the solenoid coil 30 is deenergized so that Pb is essentially equal to Pr, Pc is regulated at a maximum value, essentially equal to the pump supply pressure Ps. When the solenoid coil 30 is partially energized so that Pb is intermediate zero and Pr, Pc is regulated to a corresponding value intermediate Pc_min and Ps as illustrated in FIG. 2.

Figure 2B:
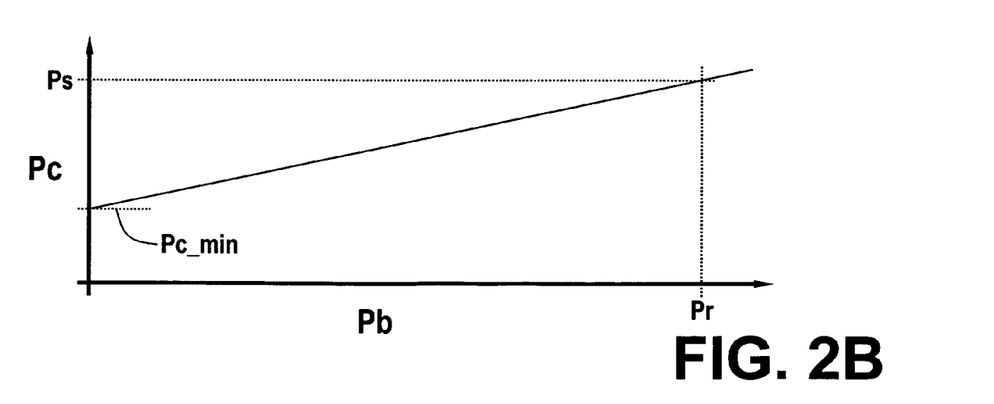

FIG. 2A additionally depicts a system controller 43 for carrying out various transmission control functions, including the appropriate energization of the solenoid coil 30 of BPV 114. In general, the required clutch pressure Pc is determined, which is used in turn to determine the required boost pressure Pb using a stored relationship such as depicted by the graph of FIG. 2B. Alternately, the boost pressure Pb may be determined directly. In any event, the system controller 43 can then determine a solenoid coil current corresponding to the required value of Pb, and energize the solenoid coil 30 accordingly using either a PWM or linear current control.

Clutch pressure is determined as follows, in order to achieve desired output torque of the exemplary EVT. Estimated dynamic torque To_Dyn is calculated using matrix equations, as follows:

$$[To\_Dyn]=[A1]*[Ta\ Tb\ Ni\_dot\ No\_dot]T$$

$$[To\_Dyn]=[A2]*[Ta\ Tb\ Ni\_dot\ No\_dot]T$$

wherein Ni_dot is acceleration of the transmission input shaft 15, No_dot is acceleration of the transmission output shaft 64, Ta is externally applied torque for electric motor A 56, Tb is externally applied torque for electric motor B 72, and A1 and A2 each comprise a matrix of parametric values determined by specific design characteristics of the transmission hardware, including inertia. A1 is the matrix for Mode 1, i.e., low range operation, and A2 is the matrix for Mode 2, i.e., high range operation. An operator requested torque value, To_req, is determined by the controller 43 as a function of throttle position and brake request (typically represented in terms of percent of maximum braking), which are input from the UI 13, and output speed No of the transmission.

Absolute torque, To_abs comprises the magnitude of output torque used to determine the required clutch torque necessary to hold the respective clutches C1 and C2 in range, and is determined as follows:

$$To\_abs=\text{Max}[abs(To\_dyn), abs(To\_req)].$$

Calculated required clutch torque Tc is determined for clutch 1 (mode 1) and cluctch 2 (mode 2), respectively, as follows:

$$Tc=B1*To\_abs$$

$$Tc=B2*To\_abs,$$

wherein B1 and B2 are output to clutch torque ratio at Mode 1, low speed and Mode 2, high speed ranges.

The calculated clutch pressure, Pc, is determined as follows:

$$Pc=Tc/(N*A*C*R),$$

wherein N is the number of clutch plates in a clutch pack, A is clutch piston working area, C is clutch static friction coefficient, and R is clutch mean friction radius (not shown). The parameters N, A, C, R are collectively referred to as parameters of each clutch. An exemplary graph showing relationship between boost pressure Pb and clutch pressure Pc is shown in FIG. 2B. Hydraulic boost pressure Pb is regulated in order to achieve a clutch pressure Pc that ensures clutch application adequate for slip free torque transfer across the clutch consistent with the output torque to be generated.

Figure 3:
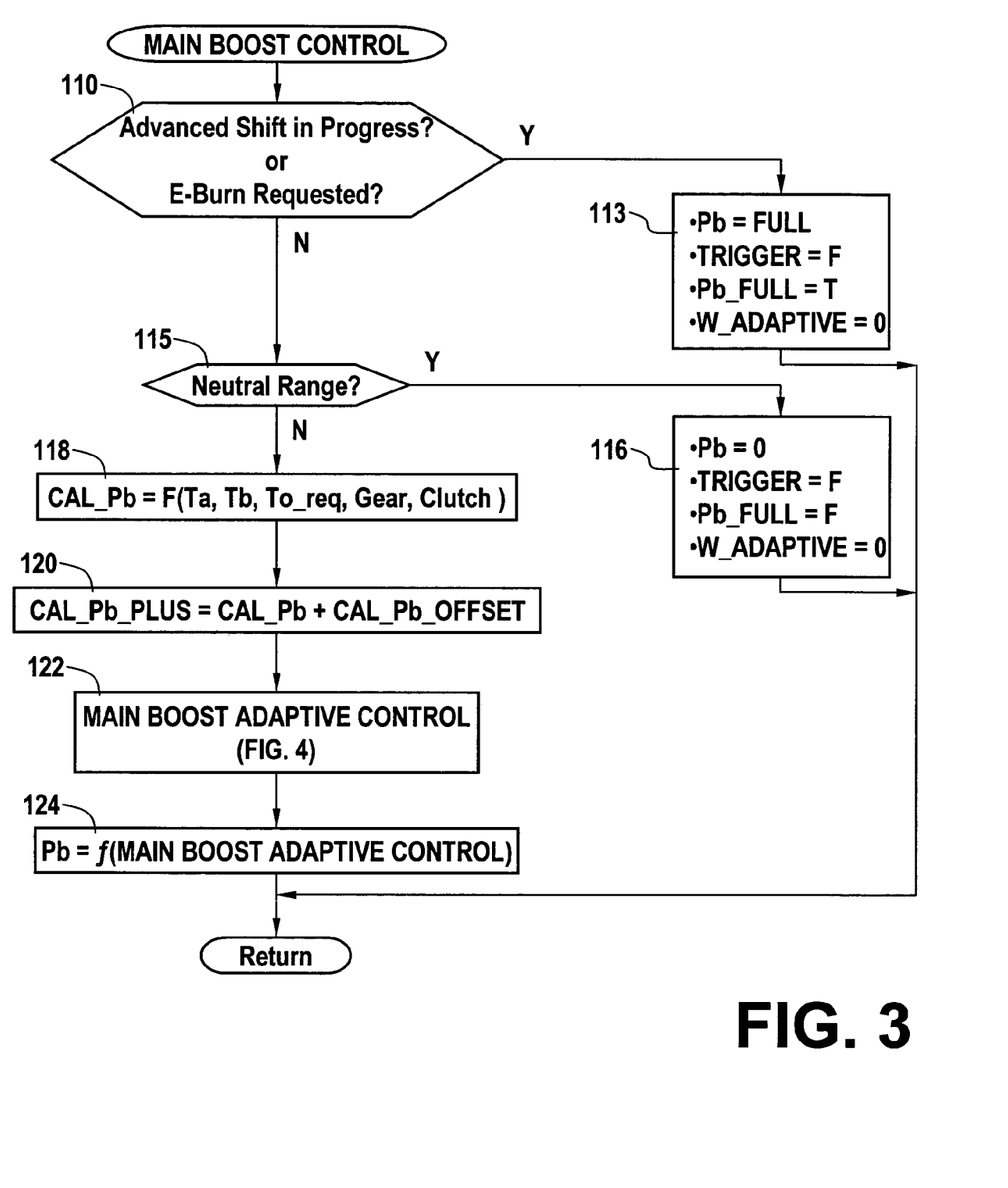
FIG. 3 illustrates a first flowchart of exemplary steps in a set of instructions executed by a computer-based controller particularly related to controlling main boost pressure of the preferred hydraulic circuit for the hybrid powertrain disclosed herein, in accordance with the present invention.
Figure 4:
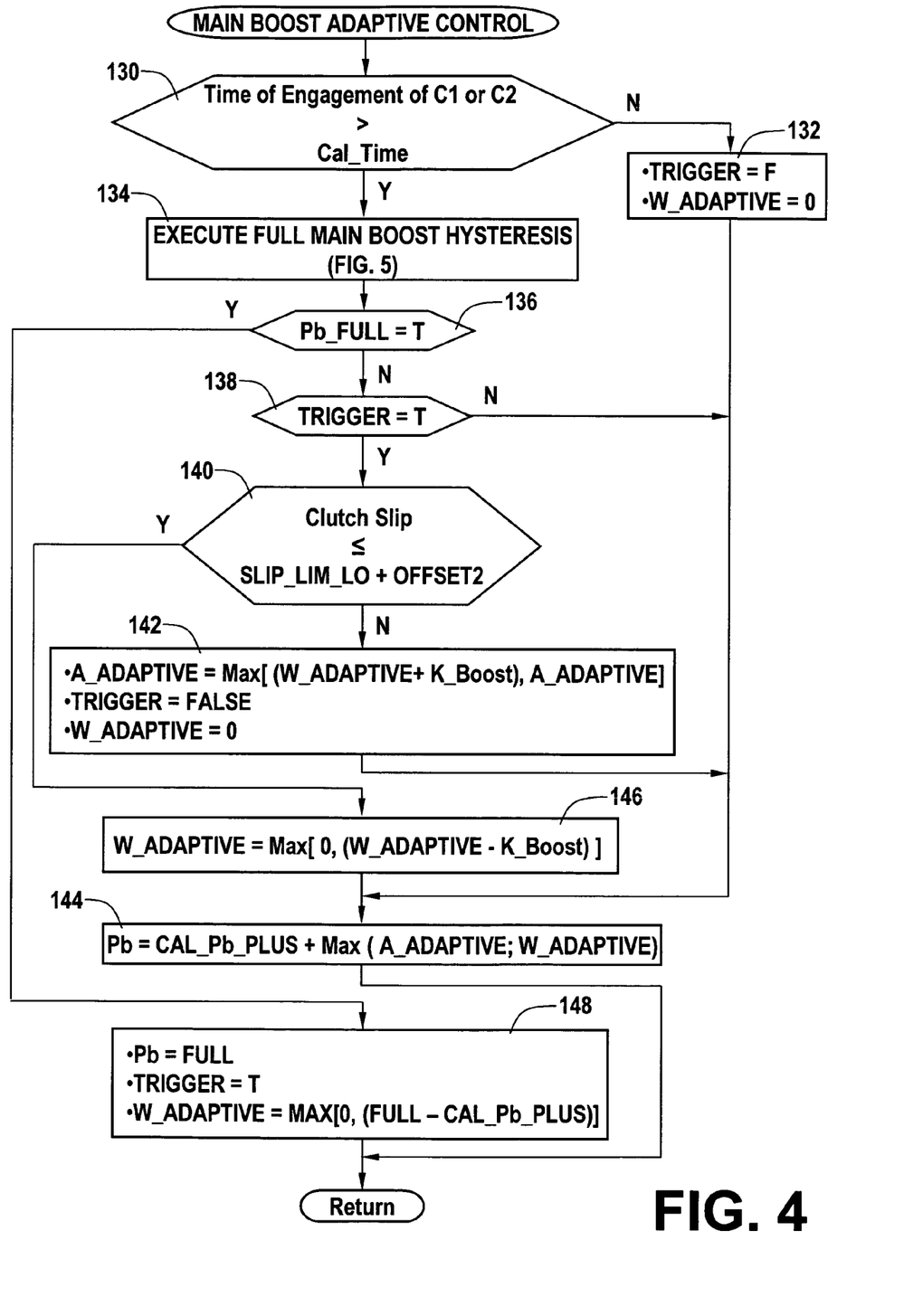
FIG. 4 is a second flowchart of the scheme to control main boost pressure of the preferred hydraulic circuit for the hybrid powertrain disclosed herein, in accordance with the present invention; and, FIG. 5 is a third flowchart of the scheme to control main boost pressure of the preferred hydraulic circuit for the hybrid powertrain disclosed herein, in accordance with the present invention.
Figure 5:
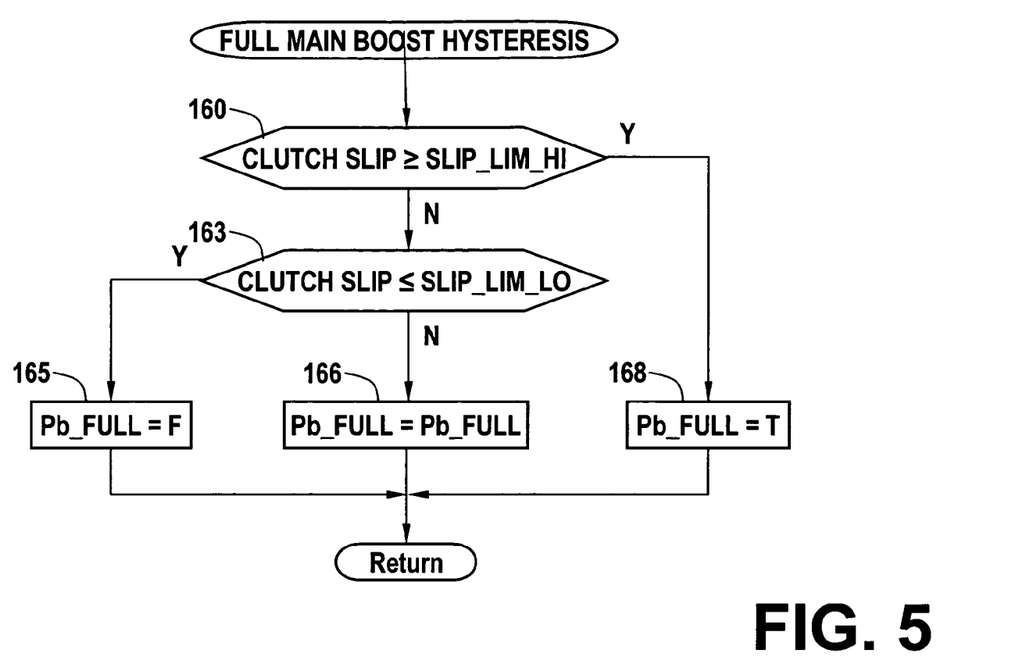

Referring now to FIGS. 3, 4 and 5, a method for regulating hydraulic clutch pressure in the electrically variable transmission 10 equipped with clutches C1 and C2 is described in detail. Regulating the hydraulic pressure comprises monitoring magnitude of slippage of the clutches C1 and C2, as described hereinabove, and controlling hydraulic boost pressure in the EVT 10 based upon the magnitude of slippage of clutches C1 and C2.

Referring specifically now to FIG. 3, a MAIN BOOST CONTROL algorithm, which comprises the method for controlling hydraulic boost pressure in the EVT 10, is described. The MAIN BOOST CONTROL algorithm is regularly executed as one or more logic algorithms in the exemplary controller 43. The MAIN BOOST CONTROL algorithm acts to regulate main boost pressure Pb and thus control clutch pressure Pc. During each execution of the MAIN BOOST CONTROL algorithm, the controller 43 monitors operation to determine whether an advanced shift is in progress or an E-burn has been requested (Block 110), indicating the desire for full main boost pressure. Shifting in the exemplary transmission is preferably accomplished synchronously at zero slip speed across both clutches C1 and C2. Full pressure is desirable during an advance shift, therefore, to ensure adequate capacity and zero slip clutch across the off-going and on-coming clutches during a shift. The E-burn refers to a soot filter regeneration event. The exhaust of the diesel engine includes a particulate filter which is controllably regenerated by burning off the trapped particulate matter (predominantly carbonaceous soot) by elevating the exhaust gas temperature. Such temperature elevation can be aided by loading the engine. Commanding full main boost pressure results in the maximum engine load relative to the hydraulic circuit requirements and hence aids in the objective of elevating the exhaust gas temperature to effect the filter regeneration. When an advanced shift is in progress or an E-burn has been requested, the controller 43 sets the commanded main boost pressure Pb, to FULL (Block 113) by commanding BPV 114 to a fully closed position. Boost pressure Pb builds to reference pressure Pr, forcing PRV 15 to a closed position, and controlling clutch pressure Pc to system pressure, Ps. Other terms, described hereinafter, are set as follows: a software flag TRIGGER is set to FALSE, flag Pb_FULL is set to True, and working variable W_ADAPTIVE is set to ZERO (Block 113).

The software flag TRIGGER, when set to TRUE, indicates to the controller 43 in subsequent executions of the MAIN BOOST CONTROL algorithm that the controller 43 had commanded the main boost pressure Pb, to be set at FULL, and that an adaptive term A_ADAPTIVE needs to be modified. The adaptive term A_ADAPTIVE is the stored adaptive main boost pressure. It is a one-sided variable that is modified only when term W_ADAPTIVE is greater than A_ADAPTIVE, as described hereinafter. The software flag Pb_FULL, when set to TRUE, triggers the controller to command the main boost pressure Pb, to FULL pressure.

When no advanced shift is in progress and no E-burn has been requested the controller 43 determines whether the EVT is set in a neutral range (Block 115). When the EVT is set in a neutral range, the controller sets the commanded main boost pressure Pb to ZERO (Block 116) by commanding BPV 114 to a fully open position. When controller 43 commands BPV 114 to a fully opened position, the BPV 114 permits flow to exhaust, boost pressure Pb falls to ZERO and clutch pressure Pc is controlled to a minimum pressure, Pc_min. Other terms, described hereinafter, are set as follows: TRIGGER flag is set to FALSE, Pb_FULL flag is set to FALSE, and W_ADAPTIVE is set to ZERO (Block 116).

When the controller 43 determines that the EVT is not set in a neutral range (Block 115), the controller 43 calculates a required main boost pressure, Pb, based upon commanded motor torques Ta and Tb of electric motors of the EVT, operator requested torque To_req, input speed Ni and acceleration Ni_dot, output speed No and acceleration No_dot, parameters of the gear train, and parameters of clutches C1 and C2 (Block 118).

A further term, CAL_Pb_PLUS, is calculated by adding the required main boost pressure, CAL_Pb and an offset value, CAL_Pb_OFFSET (Block 120). The offset value CAL_Pb_OFFSET is a precalibrated value comprising a safety margin based upon system parameters and operating characteristics to prevent clutch slip until such time as the adaptive learning in accordance with the invention adequately addresses slip. The CAL_Pb_PLUS term is employed in a second algorithm referred to as the MAIN BOOST ADAPTIVE CONTROL algorithm (Block 122, see also FIG. 4). The controller determines the commanded main boost pressure Pb based upon the outcome from executing the MAIN BOOST ADAPTIVE CONTROL algorithm (Block 124). The commanded main boost pressure Pb is set to the appropriate value by commanding BPV 114 to a partially open position. When controller 43 commands BPV 114 to a partially opened position, the BPV 114 permits partial flow to exhaust, and boost pressure Pb falls and clutch pressure Pc is controlled to a pressure level.

Referring now to FIG. 4, the MAIN BOOST ADAPTIVE CONTROL algorithm is now described in detail. Controller 43 monitors time of engagement of clutches C1 and C2, and determines whether the time of engagement of either clutch C1 or C2 exceeds a predetermined calibration time (Block 130). When the time of engagement of clutch C1 or C2 does not exceed the predetermined calibration time, software flag TRIGGER flag is set to FALSE, Pb_FULL is set to FALSE and W_ADAPTIVE is set to ZERO (Block 132). The commanded main boost pressure Pb, is set equal to the sum of CAL_Pb_PLUS and the maximum value of terms A_ADAPTIVE and W_ADAPTIVE (Block 144). The MAIN BOOST ADAPTIVE CONTROL algorithm then returns to MAIN BOOST CONTROL algorithm (Block 150).

When the time of engagement of either clutch C1 or C2 exceeds the predetermined calibration time (Block 130), the algorithm determines whether slippage of either clutch C1 or C2 exceeds a hysteresis value, by executing another algorithm FULL MAIN BOOST HYSTERESIS (Block 134), described hereinafter.

Referring now to FIG. 5, the FULL MAIN BOOST HYSTERESIS (Block 134) algorithm comprises monitoring clutch slippage, as described hereinabove. The purpose of this algorithm is to introduce hysteresis into calculation of the MAIN BOOST ADAPTIVE CONTROL algorithm shown in FIG. 4. When clutch slippage is greater than or equal to a maximum calibrated value, SLIP_LIM_HI, (see block 160), flag Pb_FULL is set to TRUE (Block 168) to later effect full main pressure. When clutch slippage is less than or equal to a minimum calibrated value, SLIP_LIM_LO, (see block 163), flag Pb_FULL is set to FALSE (Block 165) to later effect pressure adaptation. When clutch slippage is between SLIP_LIM_LO and SLIP_LIM_HI, flag Pb_FULL is unchanged from what it had been previously (Block 166) to later effect continued full main pressure or pressure adaptation.

Referring again to FIG. 4, when flag Pb_FULL is TRUE (Block 136), indicating clutch slip has been above the high limit and has not returned below the low limit, block 148 is encountered whereat commanded main boost pressure Pb, is set to FULL pressure, flag TRIGGER is set to TRUE, and W_ADAPTIVE is set to be the maximum value of either ZERO or FULL minus CAL_Pb_PLUS (Block 148). The MAIN BOOST ADAPTIVE CONTROL algorithm then returns to MAIN BOOST CONTROL algorithm (Block 148).

When flag Pb_FULL is not TRUE (Block 136), it is next determined whether the TRIGGER flag is TRUE (Block 138). Pb_FULL will be FALSE only after clutch slip falls below the low limit (FIG. 5, blocks 163 and 165). When the TRIGGER flag is FALSE, there has been no clutch slip. Therefore, the commanded main boost pressure Pb, is set equal to the sum of CAL_Pb_PLUS and the maximum value of terms A_ADAPTIVE and W_ADAPTIVE (Block 144) by bypassing any pressure adaptation. The MAIN BOOST ADAPTIVE CONTROL algorithm then returns to MAIN BOOST CONTROL algorithm (Block 150).

When the TRIGGER flag is TRUE, indicating clutch slip, it is next determined whether clutch slip is less than or equal to the precalibrated value SLIP_LIM_LO plus an OFFSET2 value (block 140). When clutch slip is less than or equal to the precalibrated value SLIP_LIM_LO plus an OFFSET2 value, W_ADAPTIVE is set equal to the maximum of either ZERO or W_ADAPTIVE minus a boost constant value, K_Boost (Block 146) to effect an incremental pressure reduction. The commanded main boost pressure Pb, is then set equal to the sum of CAL_Pb_PLUS and the maximum value of terms A_ADAPTIVE and W_ADAPTIVE (Block 144). The MAIN BOOST ADAPTIVE CONTROL algorithm then returns to MAIN BOOST CONTROL algorithm (Block 150).

When clutch slip is not less than or equal to the precalibrated value SLIP_LIM_LO plus OFFSET2 value, W_ADAPTIVE is set equal to ZERO, TRIGGER flag is set to FALSE, and A_ADAPTIVE is set equal to a maximum value of either W_ADAPTIVE plus boost constant value, K_Boost, or A_ADAPTIVE (Block 142). Block 142 executes subsequent to a pressure reduction adaptation loop wherein a minimum slip (above the low limit) is detected. Block 142 effects a positive increment to W_ADAPTIVE to bring the term back up to the previous pressure that effected no slip (slip below the low limit). Again, the commanded main boost pressure Pb, is then set equal to the sum of CAL_Pb_PLUS and the maximum value of terms A_ADAPTIVE and W_ADAPTIVE (Block 144). The MAIN BOOST ADAPTIVE CONTROL algorithm then returns to MAIN BOOST CONTROL algorithm (Block 150).

The invention has been described with specific reference to the preferred embodiments and modifications thereto. Further modifications and alterations may occur to others upon reading and understanding the specification. It is intended to include all such modifications and alterations insofar as they come within the scope of the invention.

The invention claimed is:

1. A method to regulate hydraulic clutch pressure in an electrically variable transmission equipped with at least one clutch, comprising:
monitoring magnitude of slippage of the at least one clutch;
monitoring operator inputs;
determining requested operator torque command;
determining a required main boost pressure, based upon the requested operator torque command, the monitored operator inputs, operating characteristics of the EVT, and characteristics of the at least one clutch; and,
determining a commanded main boost pressure based upon the determined required main boost pressure.

2. The method of claim 1, wherein determining the commanded main boost pressure based upon the calculated required main boost pressure comprises:
monitoring time of engagement of each of the at least one clutches;
monitoring slippage of each of the at least one clutches;
determining at least one adaptive boost pressure term based upon time of engagement of each of the plurality of clutches and slippage of each of the clutches; and,
compensating the calculated required main boost pressure with one of the determined at least one adaptive boost pressure terms.

3. The method of claim 2, further comprising setting the commanded main boost pressure to zero when an advanced shift is in progress.

4. The method of claim 2, further comprising setting the commanded main boost pressure to zero when an E-burn is requested.

5. The method of claim 2, further comprising setting the commanded main boost pressure to zero when a shift selector for the electrically variable transmission is in a neutral gear.

6. The method of claim 2, further comprising setting the commanded main boost pressure to a maximum value, when one of the clutches has been engaged longer than a predetermined amount of time and slippage of said clutch exceeds a predetermined value.

7. The method of claim 2, further comprising setting the commanded main boost pressure to a maximum value when slippage of at least one of the clutches exceeds a predetermined value.

8. The method of claim 2, wherein determining at least one adaptive boost pressure term based upon time of engagement of each of the plurality of clutches and slippage of each of the clutches includes introducing hysteresis into determination of the one adaptive boost pressure term, based upon magnitude of clutch slippage.

9. A method to control clutch slippage of an electrically variable transmission equipped with at least one clutch, comprising:
monitoring magnitude of slippage of the at least one clutch; and, controlling hydraulic boost pressure based upon the magnitude of clutch slippage, comprising:
monitoring operator inputs;
determining requested operator torque command;
determining a required main boost pressure, based upon the requested operator torque command, the monitored operator inputs, operating characteristics of the EVT, and characteristics of the at least one clutch; and,
determining a commanded main boost pressure based upon the determined required main boost pressure.

10. A system for controlling hydraulic pressure in an electrically variable transmission, comprising:
said electrically variable transmission comprising at least one hydraulically controlled clutch, and a hydraulic system with a pressure regulator;
a system controller operable to:
control the electrically variable transmission,
determine slippage of the at least one hydraulically controlled clutch,
monitor operator inputs;
determine requested operator torque command;
determine a required main boost pressure, based upon the requested operator torque command, the monitored operator inputs, operating characteristics of the EVT, and characteristics of the at least one clutch; and,
determine a commanded main boost pressure based upon the determined required main boost pressure.

11. An electrically variable transmission, including a system for controlling hydraulic pressure comprising:
said electrically variable transmission comprising at least one hydraulically controlled clutch, and a hydraulic system with a pressure regulator;
a system controller, operable to:
control the electrically variable transmission, determine slippage of the at least one hydraulically controlled clutch
monitor operator inputs;
determine requested operator torque command;
determine a required main boost pressure, based upon the requested operator torque command, the monitored operator inputs, operating characteristics of the EVT, and characteristics of the at least one clutch; and,
determine a commanded main boost pressure based upon the determined required main boost pressure.

* * * * *